Jan. 5, 1960 L. A. FERNANDEZ-RIVAS ET AL 2,919,968
MAGNETIC RECORDING ERROR CONTROL
Filed Aug. 27, 1956
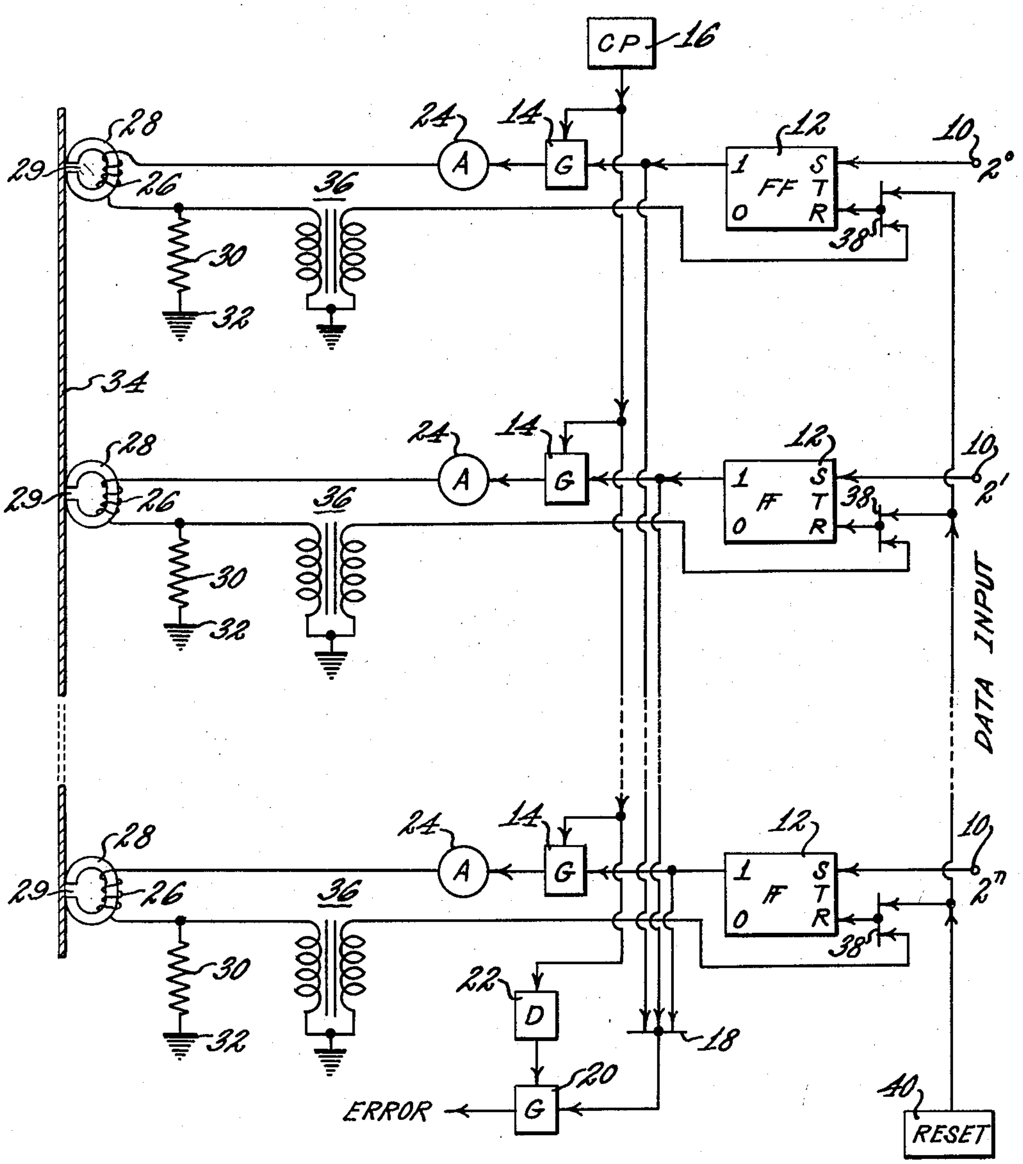
INVENTORS
LUIS A. FERNANDEZ-RIVAS
& ARNOLD M. SPIELBERG
BY Morris Rabkin
ATTORNEY United States Patent Office 2,919,968

Patented Jan. 5, 1960

2,919,968

MAGNETIC RECORDING ERROR CONTROL

Luis A. Fernandez-Rivas, Levittown, Pa., and Arnold M. Spielberg, Haddonfield, N.J., assignors to Radio Corporation of America, a corporation of Delaware Application August 27, 1956, Serial No. 606,468

14 Claims. (Cl. 346—74)

This invention relates to magnetic recording, and particularly to a method of and means for detecting the occurrence of errors in magnetic recording systems.

Magnetic mediums are used in the field of electronic computers and many other fields for storing coded information in the form of magnetized spots. The magnetic mediums employed may include, for example, tape, wire, or drums on which the magnetic record is impressed by one or more recording heads. The coded information to be recorded passes through gating, switching, and other networks before arriving at the recording heads. During this travel, certain of the information may become lost or altered due to transient errors, or to temporary or permanent malfunctioning of the circuitry.

It is therefore desirable to provide some method of ascertaining whether the coded information has reached the magnetic recording heads. Since the recording heads are usually reliable, once an electrical signal representing coded information has reached these heads, the probability of the information not being recorded is very small.

It is therefore an object of this invention to provide a novel method of and apparatus for detecting errors in recording information on magnetic media.

Another object of this invention is to provide a novel method and a novel means for ensuring that the coded information desired to be recorded actually reaches the recording heads.

An additional object of this invention is to provide a novel apparatus for quickly and rapidly assuring that electrical information signals are accurately transmitted to magnetic recording heads.

In accordance with one embodiment of the invention, electrical signals representing bits of coded information are applied to the set inputs of the respective stages of a register. The register outputs are coupled to recording heads for recording on a magnetic medium. A return signal (sample) is derived from each magnetic recording head and is used to determine the accuracy of the transmitted signals representing the coded information. Each returning signal resets the particular stage of the register from which the particular bit of information was obtained. Any register stages not reset indicates an error. The return signal may be derived by taking the voltage developed by the signal current across a small resistor placed in series with the winding on each recording head.

The novel features of this invention as well as the invention itself, both as to its organization and method of operation, will best be understood from the following description when read in connection with the accompanying drawing, in which like reference numerals refer to like parts, in which:

The sole figure is a block diagram of an embodiment of this invention.

In the figure, a plurality of input terminals 10 are illustrated. Each of the terminals 10 may receive a respective bit (binary digit of information) as an electrical signal from what is herein termed the data input. The data input may, for example, be part of a computing system handling binary coded information wherein each of the inputs 10 receives the bits of information $2^0$, $2^1$, to $2^n$, respectively. Three input channels, respectively, corresponding to three bits are illustrated. The drawing is shown as broken between the $2^1$ and the $2^n$ channels to indicate that additional channels may be added as desired. Each of the input terminals 10 is coupled to the set input S of a flip-flop 12. The flip-flops 12 are employed in a group to function as a register for storing the coded information.

A flip-flop is a circuit having two stable states or conditions, and two corresponding input terminals, one of which may be designated as reset (R) and the other as set (S). The flip-flop assumes the set condition in response to the application of a high level (or pulse) on the set input terminal S. The flip-flop assumes the reset condition in response to the application of a high level (or pulse) on the reset terminal R. Two outputs are frequently associated with the flip-flop circuit. The Boolean tags of "one" and "zero" are associated with these outputs. If the flip-flop is in its set condition (that is, set) the output voltage at the "one" output is high and the output voltage at the "zero" output is low. Unless otherwise indicated, the outputs from the flip-flop are taken from the "one" terminal. If the flip-flop is reset (that is, in its reset condition) the output voltage at the "one" terminal is low and the voltage at the "zero" terminal is high. A flip-flop may also be provided with a trigger terminal T. Application of pulses to the trigger terminal T causes the flip-flop to assume the other condition from the one it was in when the pulse was applied.

The "one" outputs of the flip-flops 12 for the $(n+1)$ information channels $2^0$ to $2^n$, inclusive, are coupled, respectively, as the first inputs of $(n+1)$ two-input "and" gates 14. The gates are each logical "and" gates, and are indicated by rectangles with an inscribed G. The priming leads to the gate are indicated by arrows directed toward the rectangle; the output leads are indicated by an arrow directed away from the rectangle. The output of a clock pulse source 16 provides the second input to each of the gates 14.

The "one" output of each of the flip-flops 12 also is coupled through an "or" circuit 18 to one input of a two-input error "and" gate 20. The clock pulse source 16 output is also coupled through a delay network 22 to provide the second input to the error "and" gate 20. The amount of delay introduced by the delay unit 22 is that time required for an electrical signal representing information to be recorded on tape, as will be described more fully below, added to that time required for each of the flip-flops 12 to be reset.

The output of each of the information gates 14 is coupled through a different one of amplifiers 24 to one terminal of a corresponding one of the different coils 26 of corresponding magnetic recording heads 28. The other terminal of each coil 26 is connected through a different sampling resistor 30 to a point of reference potential, herein illustrated as ground 32. The latter terminal of each coil 26 is also connected through a corresponding transformer 36, respectively, to a different "or" circuit 38, respectively. Each of the channel recording heads 28 are associated with and aligned according to their respective tape channels on a magnetic tape 34. A cross-sectional view of the tape is shown. An external means (not shown) may move the tape either into or out of the drawing. Each magnetic recording head may include an air gap 29 between the poles or pole pieces formed at the gap. The flux patterns in each gap 29 of a particular head magnetize the tape 34 in response to currents in the coil 26 in that head. The gaps 29 are shown, for convenience of illustration, with the direction from pole-to-pole, as transverse to the direction of motion of the tape 34, but parallel to the plane of the tape. Note that in many devices the gaps in the recording heads are arranged so that the tape travel is parallel to the line from pole-to-pole. The amplifiers 24 may be any suitable amplifier which is capable of providing a pulsed current output of sufficient magnitude to effect recording on the tape 34. The amplifiers 24 provide the output with respect to ground whereby a circuit is completed through the magnetic head winding 26 and the sampling resistor 30. The ground connections to the circuits, shown in block form, such as the amplifiers 24, are not specifically indicated on the drawing.

The output of each "or" circuit 38 is coupled to the respective reset input R of its associated flip-flop 12. A reset source of pulses 40 is also coupled through each of the reset "or" circuits 38 to the reset input R of each of the flip-flops 12. The source of reset pulses 40 may be any source of pulses suitable for resetting all of the flip-flops 12 simultaneously.

In operation, all of the flip-flops 12 are initially reset. Next, the input terminals 10 receive the coded electrical information from the data input whereby the information is coupled to the respective set terminals S of the flip-flops 12. As a result of applying these signals, this information is stored in the flip-flop register. This input data is represented by the individual states of the flip-flops 12. The "one" output of any flip-flop 12 is either a high signal level or a low signal level corresponding to this information. The flip-flop register acts as a staticizer, that is, it is a storage device for converting time sequential information into static parallel information.

Next, the "one" output of each of the flip-flops 12 is gated by the application of a clock pulse from the clock pulse source 16 to each of the "and" gates 14. The electrical signals representing information thus pass from the output of the gates 14 through each of the amplifiers 24, through a coil 26 of each of the recording heads 28, through the sampling resistor 30 to a point of reference potential, such as ground 32. The electrical signals passing through the coils 26 of the recording heads 28 thereby record magnetized spots on the tape strip 34, representative of the information contained in the respective data input signals. Corresponding return signals appear across the sampling resistor 30 of the recording heads 28. Each of these returning "echo" signals so obtained across the resistor 30 is transmitted back through the transformer 36 through each of the respective "or" circuits 38 to reset the corresponding flip-flops 12.

The collective outputs of the flip-flops 12 is now sampled by the delayed output of the clock pulse source 16 applied at gate 20 to ascertain if each of the flip-flops 12 has returned to a "zero" condition. If any flip-flop 12 is not in the "zero" condition at the time of the delayed clock pulse, the gate 20 provides an output as an error signal.

By way of illustration, assume that the data from the data input applied to each of the input terminals 10 consists of information represented by a high input signal on the $2^0$ and $2^1$ channels and a low level signal on the $2^n$ channel. Each of the flip-flops 12 staticize this information. The flip-flops 12 for the $2^0$ and $2^1$ channels are set and provide high level outputs at the respective "one" outputs. The flip-flop 12 of the $2^n$ channel is reset and provides a low level "one" output. On the application of a clock pulse from the source 16, the gates 14 for the $2^0$ and $2^1$ channels pass a high level signal pulse to the respective channel recording heads 28. No pulse is applied to the $2^n$ channel recording head 28. A voltage builds up across each of resistors 30 for the $2^0$ and $2^1$ channels due to the voltage divider action of each coil 26 and resistor 30 combination. This voltage is transmitted back as an "echo" signal and each of the flip-flops 12 of the $2^0$ and $2^1$ channels is reset by the corresponding voltage. Upon the occurrence of the delayed clock pulse at the error gate 20, since each of the flip-flops 12 is reset, no output and thus no error signal occurs.

Assume, however, that the high level signal on the $2^1$ channel had not arrived in the $2^1$ channel recording head 28, due to a transient error or a loss at some point in the switching circuitry for the recording heads. In this event, the $2^1$ channel flip-flop 12 receives no "echo" signal and remains set, thereby providing a continuous high level "one" output. Thus, when each of the flip-flops 12 is sampled through "or" circuit 18 by the error gate 20 a high level signal is present. The error gate 20 then provides an error signal.

It will be understood that an important feature of the invention resides in the information being applied to the recording coils 26 of each of the heads 28 and a returning signal being obtained from each of the sampling resistors 30. The means employed for checking need not be that herein shown and described. The checking means may include an indicating device such as a relay or a neon light responsive to the returning signal for indicating which of the magnetic heads 28 has actually received a signal.

In alternative embodiments of this invention, a redundant code may be used, for example, so as to include an extra bit (a parity bit) to make the total number of binary "ones" an even number for even parity. In this manner, a suitable parity check circuit coupled to receive the returning signals may be employed to indicate that the signals echoed by the recording heads 28 have a correct parity. A suitable parity check circuit is shown and described for example in U.S. Patent No. 2,719,959, issued to L. C. Hobbs, October 4, 1955.

In still other embodiments of the invention, the returning signal from the respective recording heads 28 may be coupled to the respective trigger input terminal T of the flip-flop 12. Sampling of the gate 20 by the delayed pulse from clock pulse source 16 provides an error indication in the event that any of the flip-flops 12 are in the "one" condition at the time of the sampling pulse. A magnetic drum, wire, plurality of wires, or other magnetic recording media may be employed instead of the magnetic tape as illustrated in the drawing.

There has thus been described a novel method of and means for detecting the occurrence of errors in magnetic recording systems. This method and system provide a quick and simple means of assuring that electrical information has been accurately transmitted to magnetic recording heads.

What is claimed is:

1. An error control system for ascertaining that input information to be recorded on magnetic media accurately reaches a magnetic recording head, said system comprising a staticizing means, means coupling said staticizing means to said recording head for supplying said input information thereto, means for sampling the information at said recording head, and means coupling said sampling means to said staticizing means for coupling the sampled information thereto.

2. A system for detecting an error in recording an input information signal on a magnetic medium comprising, in combination, a flip-flop having an output, a recording head, means for deriving from said output said input signal for application to said recording head, means associated with said recording head for obtaining a returning signal representative of said input signal actually arriving at said recording head, and means for applying said returning signal to flip-flop.

3. An error control system for insuring that information staticized in a flip-flop arrives at a magnetic recording head, means coupling said flip-flop to said recording head, means coupled to said recording head for obtaining a returning signal representing the information arriving at said recording head, means responsive to said returning signal means for resetting said flip-flop, and means coupled to said flip-flop for ascertaining that said flip-flop has been reset.

4. An error control system for insuring that information signals staticized in a plurality of channels is actually applied to a magnetic recording head for each of said channels, each of said channels including a flip-flop, means coupling each flip-flop to a recording head, means coupled to each recording head for obtaining a returning signal representing the information signal at said recording head, means coupled to said returning signal means for resetting the flip-flop associated with that recording head, and means coupled to each flip-flop for ascertaining that each flip-flop is reset.

5. The system as claimed in claim 4 wherein each recording head has a winding and each returning signal means includes an impedance coupled serially with its recording head winding.

6. An error detecting system for determining if an information signal to be recorded on a magnetic recording medium actually reaches a magnetic recording head for recording on said magnetic medium comprising, in combination, a flip-flop having a set and a reset input, and a set output corresponding to said set input, means coupling said set output to said recording head, means serially coupled with said recording head for obtaining a returning signal representative of said information reaching said recording head, means coupling said returning signal means to said flip-flop reset input, and means for thereafter sampling said flip-flop to determine if said flip-flop is in its set condition whereby the failure of the flip-flop to be reset by said returning signal means indicates an erroneous signal reached said recording head.

7. A system for insuring that information is recorded on a magnetic storage medium, said system comprising flip-flop for staticizing said information, means for recording said staticized information on said magnetic storage medium, means for sampling said information during said recording and means for applying said sampled information to said flip-flop.

8. In a system in which coded information staticized in registers is applied to magnetic recording heads, said system comprising means for applying said staticized information to said magnetic recording heads, means for obtaining returning signals representing said information actually reaching said recording heads, means for resetting said registers to zero by said returning signals, and means for ascertaining that said registers are reset to zero.

9. In a system for recording on a magnetic storage medium coded information staticized in registers, means for recording said staticized information on said magnetic storage medium, means for obtaining an echo signal representing said recorded information, means for resetting said register to zero by said echo signal and means for gating said reset staticized information.

10. In a system in which information staticized in a group of flip-flop registers is applied for recording on a magnetic recording medium, means for gating said information staticized in said flip-flops to said recording heads, means for obtaining an echo signal representing the staticized information actually arriving at said recording heads, and means for setting said flip-flops to insure that each of said flip-flops has been reset to zero.

11. In a system for insuring that information to be recorded reaches a magnetic recording head, the combination comprising means for staticizing said information, means controlled by said staticizing means for applying to said head a recording current corresponding to said information, means for sampling said current while said current is being applied to said head for recording, and means coupled to, and responsive to current sampled by, said sampling means for manifesting the existence at said head of said current corresponding to said information.

12. In a system for insuring that information to be recorded reaches a magnetic recording head having a winding, the combination comprising a flip-flop, means for applying an input information signal to said flip-flop, means coupling said flip-flop to said winding for applying to said winding a recording current representative of said information, means coupled to said winding for sampling said current while said recording current is being applied to said winding, and means coupled to, and responsive to current sampled by, said sampling means for deriving an echo signal manifesting the existence in said winding of said recording current.

13. A system for insuring that information to be recorded reaches the winding of a magnetic recording head comprising means for staticizing said information to be recorded, means controlled by said staticizing means for applying to said winding a recording current corresponding to said information, means for sampling said current while thus applying said current for recording, means coupled to, and responsive to current sampled by, said sampling means for deriving an echo signal manifesting the existence in said winding of said recording current representing said information, and means coupled to said last-named means and to said staticizing means for deriving an error signal when said echo signal fails to manifest the existence in said winding of current representing said information.

14. A system for insuring that information to be recorded reaches the winding of a magnetic recording head comprising means for staticizing said information to be recorded, means controlled by said staticizing means for applying to said winding a recording current corresponding to said information, means for sampling said current while thus applying said current for recording, means coupled to, and responsive to current sampled by, said sampling means for deriving an echo signal manifesting the existence in said winding of said recording current representing said information, and means coupled to said last-named means and to said staticizing means for deriving an error signal when said echo signal fails to manifest the existence at said head of current representing said information.

References Cited in the file of this patent

UNITED STATES PATENTS

| | | |
|---|---|---|
| 2,700,755 | Burkhart | Jan. 25, 1955 |
| 2,702,380 | Brustman | Feb. 15, 1955 |
| 2,719,959 | Hobbs | Oct. 4, 1955 |
| 2,789,026 | Nordyke | Apr. 16, 1957 |
| 2,793,344 | Reynolds | May 21, 1957 |
| 2,827,623 | Ainsworth | Mar. 18, 1958 |